United States Patent
Nagashima et al.

(10) Patent No.: US 7,869,157 B2
(45) Date of Patent: Jan. 11, 2011

(54) MAGNETIC DISK DRIVE HAVING DUAL ACTUATOR

(75) Inventors: Masaki Nagashima, Monterey, CA (US); Shinsuke Nakagawa, Tsuchlura (JP)

(73) Assignee: Hitachi Global Storage Technologies Netherlands B.V., Parnassustoren, Amsterdam (NL)

( * ) Notice: Subject to any disclaimer, the term of this patent is extended or adjusted under 35 U.S.C. 154(b) by 28 days.

(21) Appl. No.: 12/482,213

(22) Filed: Jun. 10, 2009

(65) Prior Publication Data
US 2009/0310250 A1 Dec. 17, 2009

(30) Foreign Application Priority Data
Feb. 12, 2008 (JP) .............................. 2008-030953
Jun. 13, 2008 (JP) .............................. 2008-154996

(51) Int. Cl.
*G11B 5/596* (2006.01)
(52) U.S. Cl. .................................................. 360/77.04
(58) Field of Classification Search ........................ None
See application file for complete search history.

(56) References Cited

U.S. PATENT DOCUMENTS 5,404,255 A 4/1995 Kobayashi et al.
6,724,563 B2 4/2004 Kobayashi et al.
6,898,039 B2 5/2005 Kobayashi et al.
7,019,938 B2 * 3/2006 Miyata et al. ............ 360/78.05

FOREIGN PATENT DOCUMENTS

JP 04-368676 12/1992
JP 2000-182340 6/2000

\* cited by examiner

*Primary Examiner*—K. Wong
(74) *Attorney, Agent, or Firm*—Matthew A. Pequignot; Pequignot + Myers LLC

(57) ABSTRACT

In a dual-stage actuator magnetic drive having a coarse actuator and a fine actuator, an amplitude level of a command signal for the fine actuator during a decoupling-path control depends on a gain of an applied fine actuator model. The fine actuator model gain depends on the amplitude level of the fine actuator command signal and needs to be calibrated to avoid performance degradation. The gain is calibrated by determining a deviation of the fine actuator model gain from the fine actuator gain during decoupling-path control. This deviation is obtained by comparing gain values of the open-loop transfer functions measured for the decoupling-path control case and the single coarse actuator control case with respect to the feedback loop of the coarse actuator at an excitation signal frequency, when the excitation signal is added to the coarse actuator.

13 Claims, 5 Drawing Sheets

Prior Art

MAGNETIC DISK DRIVE HAVING DUAL ACTUATOR

CROSS-REFERENCE TO RELATED APPLICATIONS

The present invention claims priority from Japanese Patent Application No. JP2008154996 filed Jun. 13, 2008 and JP2008030953 filed Jun. 13, 2008, which are incorporated herein by reference.

TECHNICAL FIELD

The present invention relates to a magnetic disk drive having dual-stage actuator, and in particular to a gain calibration method of a fine actuator model for a control technique called decoupling-path control method.

BACKGROUND OF THE INVENTION

In magnetic disk drives such as hard disk drives, a voice coil motor drives an arm supporting a magnetic head to place the magnetic head on a target location of a magnetic disk, thus recording and reproducing information.

To achieve a higher positioning accuracy, there has been recently proposed a magnetic disk drive equipped with so-called dual-stage actuator system, in which a fine actuator, driven by a piezoelectric element or the like, is placed on the arm in addition to a coarse actuator such as a voice coil motor.

One of the control methods for the dual-stage actuator magnetic head positioning mechanism is a method called decoupling-path control disclosed in Patent Document 1. In the decoupling-path control, an amount of displacement of the fine actuator is added to the reference signal of the coarse actuator, and in the case in which direct measurement of the amount of displacement of the fine actuator is not possible or difficult, the amount of displacement is estimated using a fine actuator model.

FIG. 5 shows an example of the dual-stage actuator position control mechanism using the decoupling-path control method. By adding the output of the fine actuator (Micro-Actuator (MA)) $P_M$, which is estimated using the fine actuator model $\hat{P}_M$ and denoted by $Y_M$, to an input signal E of a VCM controller $G_V$, the closed loop transfer function of the entire system is defined by a product of the two transfer functions representing individual closed loop systems constructed for actuator $P_M$, and VCM, and if each closed loop system is stable, a stable decoupling-path control system is realized.

In the case where a modeling error exists, as the control system is not completely decoupled, it is required to identify the gain of the fine actuator MA by, for example, the method disclosed in Patent Document 2, thereby calibrating the model gain. Patent Document 2 discloses a dual-stage actuator position control device having a means for generating the command signal to excite the fine actuator at frequency fn, a VCM controller with a notch filter to cut off the frequency component at fn, and an adaptive identification means for estimating the gain of the fine actuator from a command signal of the fine actuator and a head position signal.

[Patent Document 1] JP-A-04-368676
[Patent Document 2] JP-A-2004-30731

It is known that in the fine actuator or the like driven by a PZT element, the gain characteristics vary depending on the amplitude of the input to the fine actuator due to the hysteresis of the PZT element. Therefore, in a method of obtaining the gain by disconnecting the fine actuator from the control loop and directly exciting the fine actuator such as the method disclosed in Patent Document 2, it is required to adjust the amplitude of the excitation signal for gain identification to represent the amplitude of the command signal applied to the fine actuator during the decoupling-path control.

However, since the fine actuator command signal during the decoupling-path control varies due to the gain of the fine actuator, due to characteristics of the coarse actuator, due to disturbances acting on the control system, and other factors, it is desirable to measure the actual fine actuator command signal during the decoupling-path control for each head and each drive, and adjust the excitation signal accordingly for gain identification. However, since the fine actuator command signal during the decoupling-path control also varies due to the gain of the fine actuator model which is yet to be calibrated, it is difficult to accurately determine the fine actuator command signal in general, and as a result, there always exists an error in the calibrated fine actuator model gain which causes degradation in the performance during the decoupling-path control.

The present invention has been made in view of the above problem to provide a magnetic disk drive for calibrating the gain of the fine actuator model based on the behavior of the fine actuator during the decoupling-path control.

SUMMARY OF THE INVENTION

A magnetic disk drive of the present invention comprises a magnetic disk, a magnetic head adapted to read out information recorded on the magnetic disk, an arm adapted to support the magnetic head, a coarse actuator adapted to drive the arm to move the magnetic head on the magnetic disk, a fine actuator adapted to adjust a position of the magnetic head with respect to the arm, a fine actuator model adapted to estimate a displacement amount of the fine actuator, a path for feeding-back a position error signal representing a positional error between a target position and a present position of the magnetic head to a controller of the fine actuator and a controller of the coarse actuator, and a decoupling path adapted to add the displacement amount of the fine actuator estimated by the fine actuator model to the reference signal of the coarse actuator. There are further provided: a switch adapted to open and close a feedback path to the fine actuator controller, a means for generating an excitation signal to be applied to the coarse actuator, and a means for calibrating the fine actuator model gain based on a deviation of the fine actuator model gain from the fine actuator gain during the decoupling-path control operation. The deviation is obtained by comparing the gain values of the open-loop transfer functions measured for the decoupling-path control case and the single coarse actuator control case. The transfer functions are those of the coarse actuator feedback loop. The gain values of the transfer functions are obtained at an excitation signal frequency during a period in which the excitation signal is applied.

In addition, the measurement of the gain of the open-loop transfer function at the excitation signal frequency is performed by exciting the coarse actuator with a sinusoidal signal. The calibration of the fine actuator model gain is repeatedly executed based on a history of the past fine actuator model gain and based on their corresponding model gain deviation, until the model gain deviation reduces to a minimum.

By the present invention, degradation in the control performance due to the fine actuator model gain error may be prevented since the gain of the fine actuator model is calibrated based on the actual behavior of the fine actuator in the decoupling-path control.

BRIEF DESCRIPTION OF THE DRAWINGS

The invention will be described in greater detail with reference to the accompanying drawings which represent preferred embodiments thereof, wherein.

DETAILED DESCRIPTION

Figure 2:
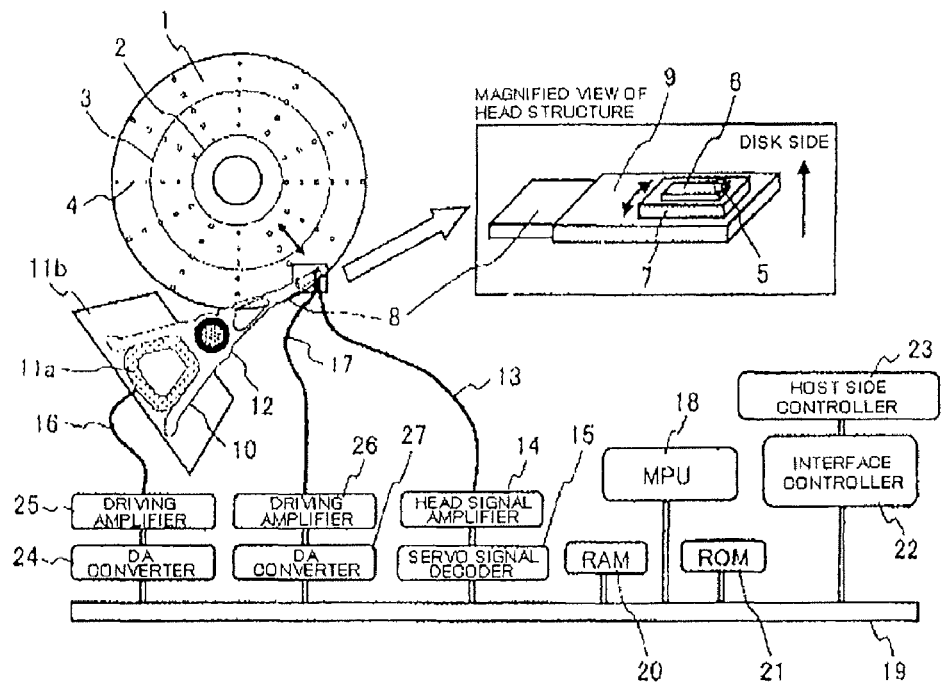
FIG. 2 is a configuration diagram of the magnetic disk drive according to one embodiment of the present invention.

FIG. 2 shows a configuration example of a magnetic disk drive according to an embodiment of the present invention. A spindle motor 2 rotates a disk 1, on which magnetic data is recorded, at a constant high speed, and servo sectors 4 used for detecting position information have been pre-recorded on each of tracks 3 disposed concentrically on the disk.

The servo sectors 4 each includes of a marker section indicating a head of the sector, an automatic gain control (AGC) section, a track number, and a burst signal used for detecting a location between adjacent tracks, and by reading the servo sectors 4, a magnetic head 5 detects the location of the magnetic head 5 on the disk 1 at a sampling period $T_S$ determined by the rotational frequency of the spindle motor 2 and the number of sectors per track.

The magnetic head 5 is formed on a slider 6, and thus may move horizontally in a radial direction of the disk 1 with the movement of a fine actuator (Micro-Actuator (MA)) 7, to which the slider 6 is attached. The fine actuator 7 is supported by a suspension 9 on the tip of a carriage arm 8, and the carriage arm 8 performs a rotational motion with respect to a pivot 12 driven by a coarse actuator (Voice Coil Motor (VCM)) 10 composed of a coil 11a which produces a magnetic force in response to application of electric current and a permanent magnet 11b, and thereby the fine actuator 7 on the tip of the carriage arm 8 is moved on the disk 1 towards the center or a perimeter of the disk 1 while moving the magnetic head 5 on the suspension 9.

The magnetic head 5 is positioned on a desired track on the disk 1 by a combination of the operations of these two actuators, and performs reading and writing of data. A head position analog signal read out by the magnetic head 5 is sent to a signal amplifier 14 via a flexible circuit 13, and a signal thus amplified is converted into a head position digital signal by a servo signal decoder 15 provided with an analog-to-digital converter.

A microprocessor system generates an analog VCM control signal 16 and an analog fine actuator control signal 17 which drive the VCM 10 and the fine actuator 7 to perform positioning of the magnetic head 5.

The microprocessor (MPU) 18 is connected via a bus line 19 to a Random Access Memory (RAM) 20 which temporarily stores state variables of the control system and a Read Only Memory (ROM) 21 which stores programs for various control systems, and executes the programs stored in the ROM 21 which describe control algorithms in response to various commands, which are sent from a host side controller 23 via an interface controller 22, to send control command signals to the VCM 10 and the fine actuator 7. Since the outputs from the MPU 18 are digital signals, these command signals are converted to analog signals by digital-to-analog (DA) converters 24 and 27 connected to the bus line 19, and then amplified by driving amplifiers 25 and 26 to be sent to the VCM 10 and the fine actuator 7, respectively.

Figure 1:
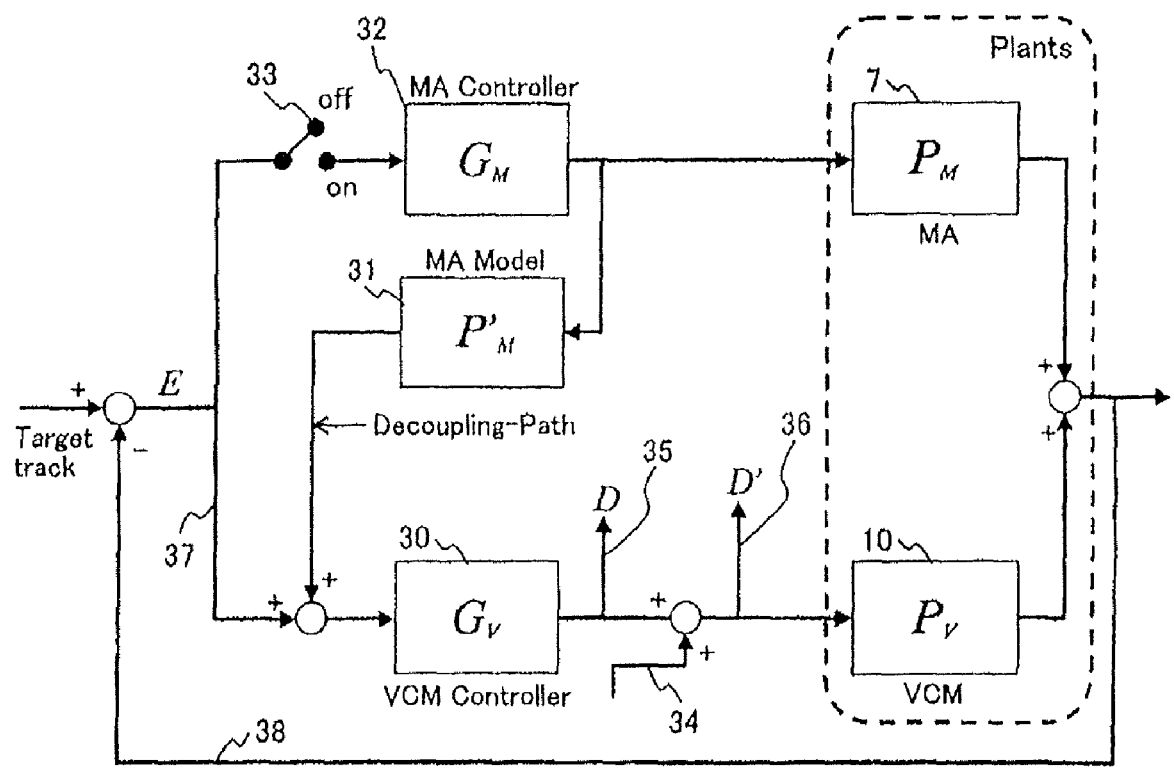
FIG. 1 is a conceptual diagram (block diagram) of a decoupling-path control method of a dual-stage actuator in a magnetic disk drive according to one embodiment of the present invention.

In the following, the decoupling-path control method of the dual-stage actuator realized by executing a magnetic head position control program stored in the ROM 21 will be explained. FIG. 1 shows a conceptual diagram, or a block diagram, of the decoupling-path control method of the dual-stage actuator. Here, $P_M$ is the fine actuator 7, $P_V$ is the coarse actuator 10, and $G_V$ represents a controller 30 for controlling the coarse actuator 10. $\hat{P}_M$ is a fine actuator model 31, and $G_M$ is a fine actuator controller 32.

In a normal operation, by turning a switch 33 to a close position (ON), the estimated displacement amount of the fine actuator 7 calculated using the fine actuator model 31 is added to an input signal (a position error signal E) 37 to the coarse actuator controller 30, the coarse actuator 10 moves the same way as in the case in which the fine actuator 7 is absent, and the fine actuator 7 suppresses disturbances at high frequencies, which cannot be sufficiently suppressed by the coarse actuator 10.

When the switch 33 is in an open position (OFF), a path for feeding-back the position error signal E to the fine actuator controller 32 is disconnected, and the estimated displacement amount of the fine actuator 7 becomes zero, resulting in no addition to the input signal 37 of the coarse actuator controller 30, and therefore, the position control is performed by the coarse actuator 10 alone.

Measurement of the open-loop transfer function of the coarse actuator loop is conducted by adding a sinusoidal signal 34 at an arbitrary frequency to a coarse actuator controller output 35. By changing the switch 33 between the close and open positions, the coarse actuator open-loop transfer function during the decoupling-path control and during the single coarse actuator control may be obtained, respectively.

Coarse actuator controller outputs D and D' during the single coarse actuator control are given as

[Formula 1]

$$D = \frac{-G_V P_V}{1 + G_V P_V} N, \; D' = \frac{1}{1 + G_V P_V} N \qquad (1)$$

and the coarse actuator open-loop transfer function $T_{OFF}$ is obtained as follows:

[Formula 2]

$$T_{OFF} = \frac{-D}{D'} = G_V P_V \qquad (2)$$

The coarse actuator controller outputs D and D' during the decoupling-path control are given as

[Formula 3]

$$D = \frac{-(1+G_M\hat{P}_M)G_V P_V}{1+G_M P_M + (1+G_M\hat{P}_M)G_V P_V} N \quad (3)$$

$$D' = \frac{(1+G_M P_M)}{1+G_M P_M + (1+G_M\hat{P}_M)G_V P_V} N$$

and the coarse actuator open-loop transfer function during the decoupling-path control $T_{ON}$ is obtained as follows:

[Formula 4]

$$T_{ON} = \frac{-D}{D'} = \frac{(1+G_M\hat{P}_M)}{(1+G_M P_M)} G_V P_V \quad (4)$$

Therefore, if there is no modeling error and $P_M = \hat{P}_M$ is satisfied,

[Formula 5]

$$T_{ON} = T_{OFF} = G_V P_V \quad (5)$$

is also satisfied.

Given the above result, by defining a function of a transfer function gain error $Q(\hat{P}_M)$ as follows,

[Formula 6]

$$Q(a) = |T_{ON}| - |T_{OFF}| = \left(\frac{|1+G_M\hat{P}_M|}{|1+G_M P_M|} - 1\right)|G_V P_V| \quad (6)$$

the problem of obtaining the fine actuator (MA) gain during the decoupling-path control operation reduces to a problem of obtaining $\hat{P}_M$ which satisfies $Q(\hat{P}_M)=0$.

Figure 3:
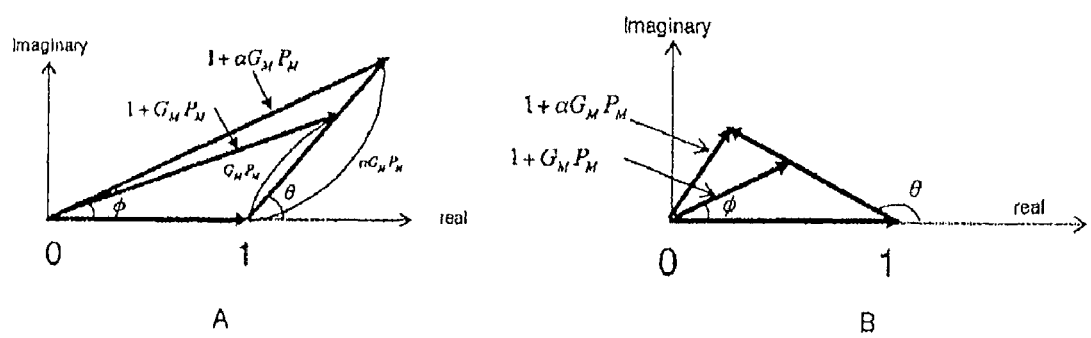
FIG. 3 is a diagram depicting the geometric relationship of the transfer functions in the complex plane.

Here, assuming that the phase delay of the fine actuator (MA) is the same as that of the fine actuator model and define $\alpha P_M = \hat{P}_M$, then the relationship between $1+G_M\hat{P}_M$ and $1+G_M P_M$ in the complex plane becomes either A or B shown in FIG. 3. In either case, the function $Q(\hat{P}_M)$ becomes monotonic either increasing or decreasing in the vicinity of $P_M = \hat{P}_M$, and $\hat{P}_M$ satisfying $Q(\hat{P}_M)=0$ may be obtained by a numerical solution such as the Newton-Raphson method. Since whether the geometric relationship is A or B is determined by $G_M P_M$, the nominal value of $G_M P_M$ can be used to distinguish the cases, or in the case it is difficult as the $G_M P_M$ is too close to the boundary that separates A and B, the relationship may be determined by actually measuring the $Q(\hat{P}_M)$ for various $\hat{P}_M$.

In the case in which the phases of the fine actuator (MA) and the fine actuator model are not the same, $P_M \neq \hat{P}_M$ even if $|T_{ON}| - |T_{OFF}| = 0$. However, if the phase difference is sufficiently small, it is possible to assume that $P_M = \hat{P}_M$ is approximately satisfied and treat the case similarly to the case in which the phases are the same.

Figure 4:
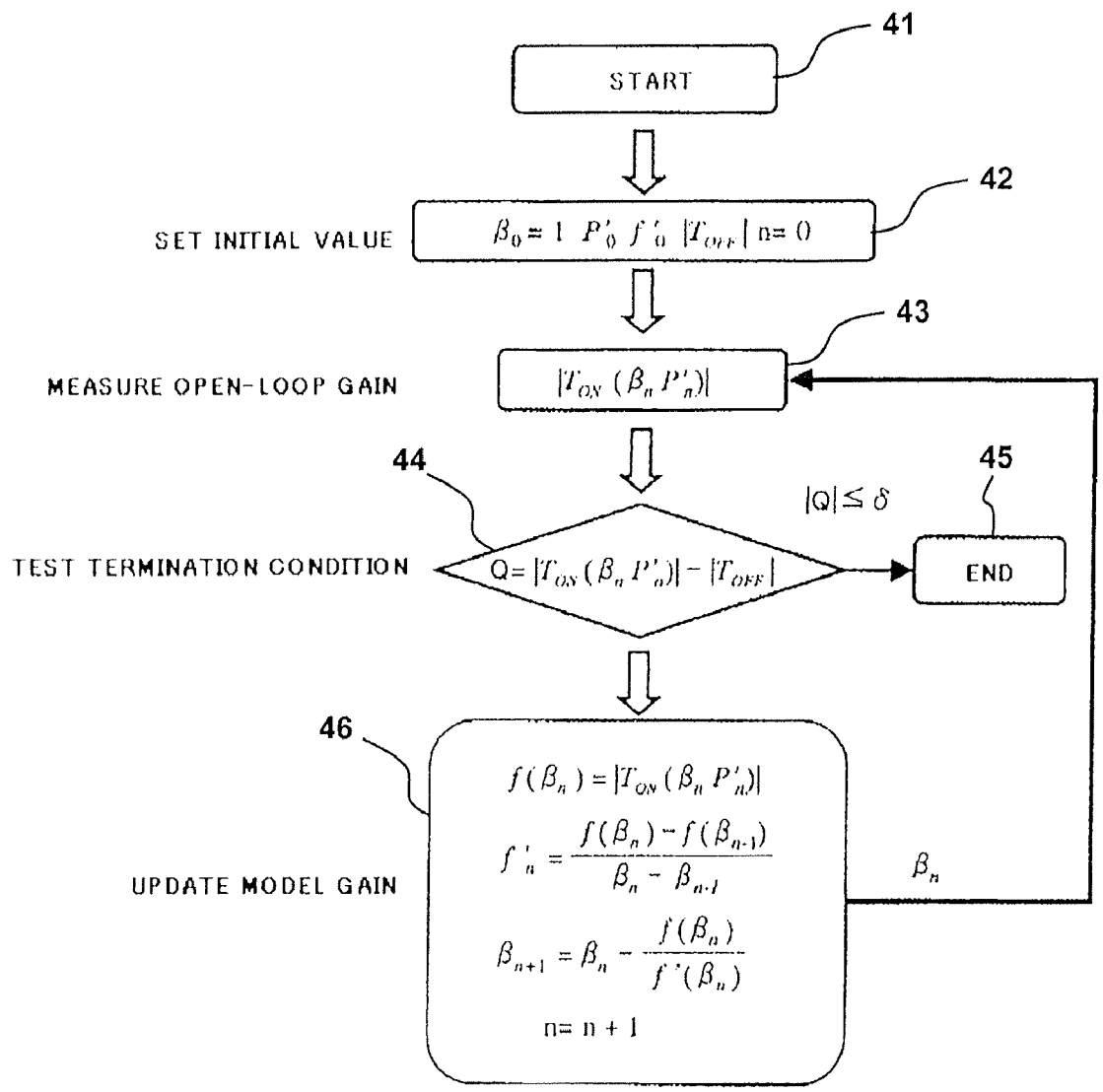
FIG. 4 is a flowchart of a model gain calibration procedure according to one embodiment of the present invention.
Figure 5:
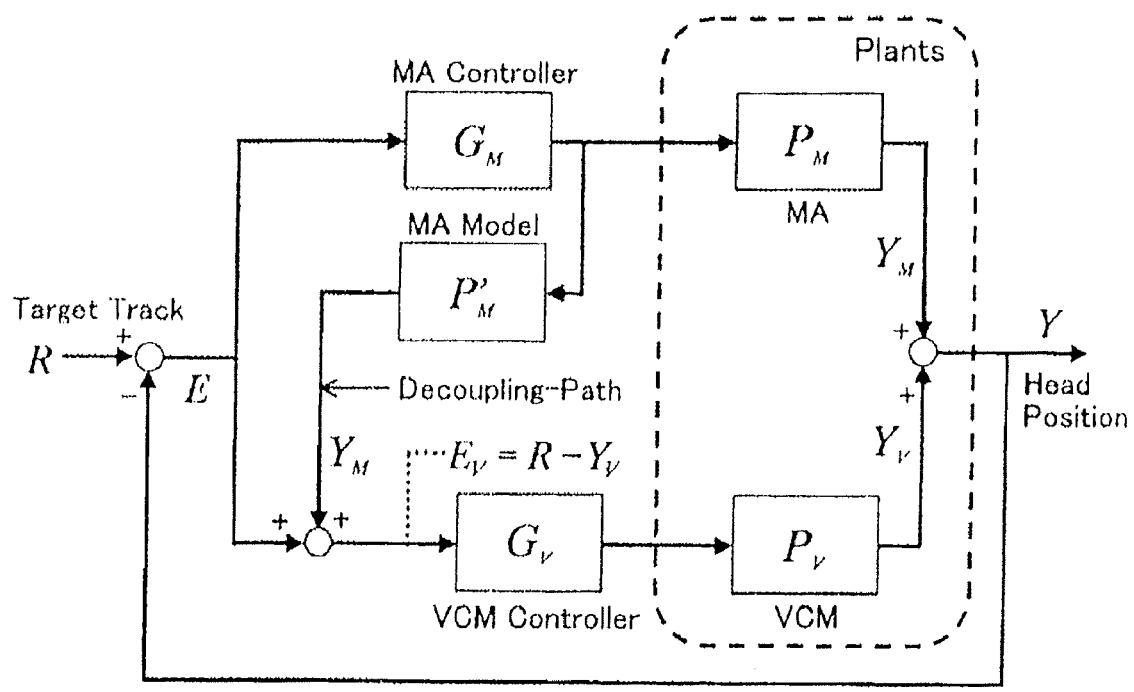
FIG. 5 is a prior-art block diagram showing a functional configuration example of a decoupling-path control system realized in the magnetic disk drive.

In the following, a procedure executed in the microprocessor 18 (see FIG. 2) will be described for the case in which the Newton-Raphson method is employed. Since it is sufficient for an initial value $\hat{P}_0$ to stay in the vicinity of $P_M$ within a range in which the decoupling-path control system is stable and the solution converges, the nominal value of the fine actuator ($P_M$) gain, the gain identified by exciting the fine actuator with an average command signal amplitude of the fine actuator (MA) during the decoupling-path control, or similar values may be used as the initial value. FIG. 4 shows a flowchart of the procedure.

The procedure starts at 41, and $|T_{OFF}|$ is obtained in an initial value setting step 42. An appropriate value is set for $f'_0$. Further, n=0, $\beta_0=1$ are set.

Then, in a coarse actuator open-loop transfer function measuring step 43, $|T_{ON}(\beta_n\hat{P}_n)|$ is measured.

Then, in a termination condition testing step 44, the error function $Q=|T_{ON}(\beta_n\hat{P}_n)|-|T_{OFF}|$ is obtained. If the error (deviation) Q is equal to or smaller than an allowable value δ, the gain calibration process is terminated at 45.

If the error (deviation) Q is not equal to nor smaller than the allowable value δ, in a model gain updating step 46, the gain coefficient $\beta_n$ of the fine actuator model $\hat{P}_M$ is updated (calibrated) along the following formulas (7), (8), and (9), and the process returns to the coarse actuator open-loop transfer function measuring step 43 after setting n=n+1.

[Formula 7]

$$f(\beta_n) = |T_{ON}(\beta_n\hat{P}_n)| \quad (7)$$

[Formula 8]

$$f'_n = \frac{f(\beta_n) - f(\beta_{n-1})}{\beta_n - \beta_{n-1}} \quad (8)$$

[Formula 9]

$$\beta_{n-1} = \beta_n - \frac{f(\beta_n)}{f'(\beta_n)} \quad (9)$$

The coarse actuator open-loop transfer function measuring step 43, the termination condition testing step 44, and the model gain updating step 46 are repeatedly executed until the error (deviation) Q becomes equal to or smaller than the allowable value δ.

Since the gain of the fine actuator model is calibrated based on the actual behavior of the fine actuator during the decoupling-path control by executing the process shown in FIG. 4, degradation in the control performance due to the fine actuator model gain error may be prevented.

Positional error E in decoupling-path control in the above method is written in the following formula (10) as the product of the coarse actuator response to the excitation signal denoted as $P_V W$ and the sensitivity function of the decoupling-path control system. When the sensitivity function exceeds 0 dB at a frequency of the excitation signal, positioning error E increases proportionally to excitation amplitude applied to the coarse actuator.

$$E = \frac{-P_V}{1+G'_M P_M + (1+G'_M P_M)G_V P_V} W \quad (10)$$

To reduce the error in measuring the open-loop transfer function of the coarse actuator during the decoupling-path control, it is preferred to select the excitation frequency such that gain of the coarse actuator is sufficiently high, and disturbance acting on the control system is small. In designing the sensitivity function of a positioning control system, on the other hand, the frequency response is preferred to be shaped such that the negative peak of the disturbance spectrum coincide with the positive peaks of the sensitivity function in order to minimize the reduction of the positioning accuracy in a frequency range where the disturbance suppression by the control system is small, that is, the gain of the sensitivity function is high. As a result, the coefficient W in formula (10) is likely to have a high gain at the excitation frequency in general.

To improve reliability of the magnetic disk drive, frequent detection of change in the MA gain and correction of the MA model gain are desired. However, when the transfer function of the formula (10) is 1 or more, data access needs to be suspended during the measurement of the open-loop transfer function of the coarse actuator in the decoupling-path control because the position error of the magnetic head is increased, and frequent measurement of the gain results in reduced drive performance.

To address such a problem, a periodic disturbance canceler may be disposed in parallel with the fine actuator controller to generate a control signal for the fine actuator to completely compensate the position error caused by the excitation of the coarse actuator, and the open-loop transfer function of the coarse actuator during decoupling-path control may be measured without degrading a position error.

Another benefit of having the disturbance canceler is that the head is positioned close to the track center even for a large movement of the fine actuator, and an accurate position error signal may be obtained to be used for gain measurement, because the linearity of the servo signal used for detecting positional error deteriorates when the distance from the track center increases.

For the measurement of the open-loop transfer function gain of the coarse actuator in the single actuator control, position error increases proportionally to the amplitude of the excitation. However, since the gain of the coarse actuator is more stable compared with the gain of the fine actuator, it is sufficient to measure the gain in the single actuator control only once, when the drive is turned on, for example, and therefore the effect of the position error increase during measurement is not significant.

Figure 6:
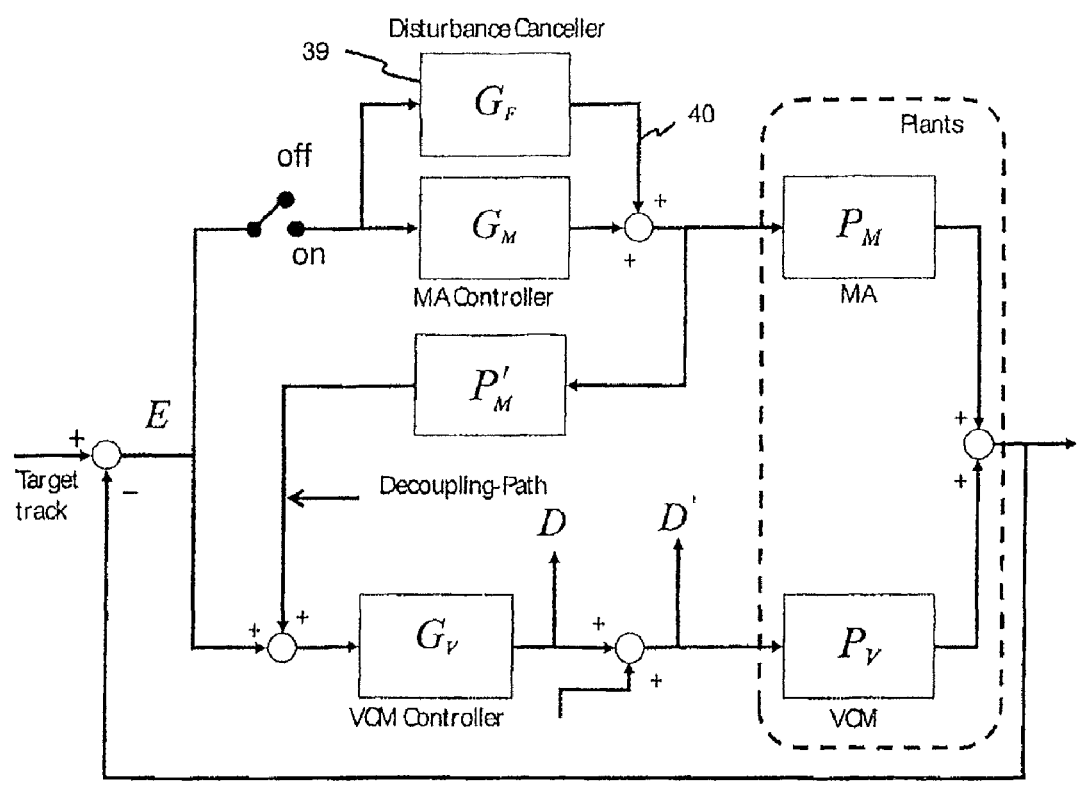
FIG. 6 is a block diagram of a functional configuration example of a decoupling-path control system comprising a disturbance canceler realized in a magnetic disk drive.

FIG. 6 shows a diagram of a disk drive decoupling-path control system wherein a periodic disturbance canceler 39 is used. The periodic disturbance canceler $G_F$ 39 is placed in parallel with the fine actuator controller 32, and generates a disturbance canceling control signal 40. For a disturbance canceler realized by a second order discrete-time infinite impulse response (IIR) filter, a discrete-time transfer function is given by formula (11).

$$G_F(z) = \frac{az^2 + bz + c}{z^2 - 2\cos(\omega_0 T)z + 1} \quad (11)$$

Here, $\omega_0$ denotes the excitation signal frequency, and T is the sample period of a fine actuator control system. Constants a, b and c are coefficients to assure stability of the system, and may easily be determined provided the reasonably accurate dynamics of the fine actuator and the coarse actuator are known. The gain of $G_F$ goes to infinity at $\omega_0$ as shown in formula (12).

$$G_F(e^{j\omega_0 T}) = \lim_{\omega \to \omega_0} \frac{ae^{2j\omega T} + be^{j\omega T} + c}{e^{2j\omega T} - 2\cos(\omega T)e^{j\omega T} + 1} = \infty \quad (12)$$

Let $G'_M = G_F + G_M$, then the position error during decoupling-path control is written as formula (13).

$$E = \frac{-\frac{1}{G'_M P'_M}}{\frac{1}{G'_M P_M} + 1 + \left(\frac{1}{G'_M P'_M} + 1\right)G_V P_V} P_V W \quad (13)$$

When the disturbance canceler is realized by formula (11), the gain of $G'_M$ also goes to infinity at the excitation frequency and the position error E at $\omega_0$ is zero in an ideal condition.

$$E(e^{j\omega_0 T}) = \lim_{\omega \to \omega_0} \frac{-\frac{1}{G'_M P'_M}}{\frac{1}{G'_M P_M} + 1 + \left(\frac{1}{G'_M P'_M} + 1\right)G_V P_V} P_V W = 0 \quad (14)$$

At the excitation frequency $\omega_0$, the open-loop transfer function of the coarse actuator is given by formula 15.

$$T_{ON} = \lim_{G'_M \to \infty} \frac{-G_V P_V (1/G'_M + P'_M)}{(1/G'_M + P_M)} \bigg|_{\omega_0} = \frac{P'_M}{P_M} G_V P_V \quad (15)$$

and, a ratio of the transfer function to $T_{OFF}$ is given by the formula 16.

$$\frac{T_{ON}}{T_{OFF}} = \frac{P'_M}{P_M} \quad (16)$$

Consequently, formula (5) still holds and an error function similar to formula (6) may be defined.

DESCRIPTION OF REFERENCE NUMERALS AND SIGNS 1 disk
2 spindle motor
3 track
4 servo sector
5 magnetic head
6 slider
7 fine actuator
8 carriage arm
9 suspension
10 coarse actuator
11a coil
11b permanent magnet
12 pivot
13 flexible circuit
14 head signal amplifier
15 servo signal decoder
16 coarse actuator command signal
17 fine actuator command signal
18 microprocessor
19 bus line
20 RAM
21 ROM
22 I/F controller
23 host side controller
24 DA converter for coarse actuator
25 coarse actuator driving amplifier
26 fine actuator driving amplifier 27 DA converter for fine actuator
30 coarse actuator controller
31 fine actuator model
32 fine actuator controller
33 switch
34 excitation signal
35 coarse actuator controller output
36 coarse actuator input
37 position error signal (E)
38 head position signal
39 periodic disturbance canceler
40 disturbance rejection signal
41 start model gain calibration procedure
42 initial value setting step
43 open-loop transfer function measuring step
44 termination condition testing step
45 end model gain calibration procedure
46 model gain updating step

We claim:

1. A magnetic disk drive comprising:
a magnetic disk,
a magnetic head adapted to read out information recorded on the magnetic disk,
an arm adapted to support the magnetic head,
a coarse actuator adapted to drive the arm to move the magnetic head on the magnetic disk in response to a coarse actuator control signal,
a fine actuator adapted to adjust a position of the magnetic head with respect to the arm, the fine actuator having a gain,
a fine actuator model adapted to estimate a displacement amount of the fine actuator, the fine actuator model having a gain,
a feedback path for feeding back a position error signal representing a positional error between a target position and a present position of the magnetic head, to a controller of the fine actuator and to a controller of the coarse actuator,
a decoupling path adapted to add the displacement amount of the fine actuator, estimated by the fine actuator model, to the coarse actuator control signal,
a switch adapted to open and close the feedback path to the controller of the fine actuator; and
an excitation signal generator for adding the excitation signal to the coarse actuator control signal,
wherein the magnetic disk drive is suitably programmed to:
(a) cause the generation of the excitation signal and add the excitation signal to the coarse actuator control signal;
(b) open the feedback path to the controller of the fine actuator using the switch and obtain a first gain value of an open-loop transfer function of a feedback loop of the coarse actuator, for the excitation signal generated;
(c) close the feedback path to the controller of the fine actuator using the switch and obtain a second gain value of the open-loop transfer function of the feedback loop of the coarse actuator, for the excitation signal generated;
(d) obtain a deviation of the fine actuator model gain from the fine actuator gain when the feedback path to the controller of the fine actuator is closed, by comparing the first and the second gain values of the open-loop transfer functions of the feedback loop of the coarse actuator; and
(e) calibrate the fine actuator model gain based on the deviation obtained.

2. The magnetic disk drive according to claim 1, wherein the fine actuator gain at the closed feedback path to the controller of the fine actuator is obtainable based on the deviation obtained in (d).

3. The magnetic disk drive according to claim 1, wherein in operation, the calibration of the fine actuator model gain is repeatedly executed until the deviation of the fine actuator model gain becomes equal to or smaller than a pre-determined value.

4. The magnetic disk drive according to claim 3, wherein the magnetic disk drive is suitably programmed to periodically update the fine actuator model gain based on a history of past updates of the fine actuator model gain and based on the previously obtained deviations of the fine actuator model gain from the fine actuator gain.

5. A magnetic disk drive comprising:
a magnetic disk,
a magnetic head positionable over the magnetic disk and adapted to read out information recorded on the magnetic disk,
an arm adapted to support the magnetic head over the magnetic disk,
a coarse actuator adapted to drive the arm to move the magnetic head on the magnetic disk, in response to an excitation signal applied to the coarse actuator,
a fine actuator adapted to adjust a position of the magnetic head with respect to the arm, by a displacement amount, the fine actuator having a gain,
a fine actuator model adapted to estimate the displacement amount of the fine actuator, the fine actuator model having a gain,
a decoupling path adapted to add the displacement amount of the fine actuator estimated by the fine actuator model to the excitation signal applied to the coarse actuator, and
a feedback path for feeding back a position error signal indicating a positional error between a target position and a present position of the magnetic head, to a controller of the coarse actuator and, in a decoupling-path control mode, also to a controller of the fine actuator,
wherein in operation, the magnetic disk drive obtains a first gain of an open-loop transfer function of a feedback loop of the coarse actuator when an excitation signal is applied to the coarse actuator and when the position error signal is fed back to the controller of the fine actuator,
wherein in operation, the magnetic disk drive obtains a second gain of the open-loop transfer function of the feedback loop of the coarse actuator when the excitation signal is applied to the coarse actuator and the position error signal is not fed back to the controller of the fine actuator,
wherein in operation, the magnetic disk drive obtains a deviation of the fine actuator model gain from the fine actuator gain in the decoupling-path control mode, wherein the deviation is obtained by comparing the first and the second gains of the open-loop transfer function, and
wherein in operation, a calibration of the gain of the fine actuator model is performed based on the obtained deviation of the fine actuator model gain from the fine actuator gain.

6. The magnetic disk drive according to claim 5, comprising a switch having an open position and a closed position, adapted to open and close the feedback path to the controller of the fine actuator, wherein the closed position of the switch corresponds to the decoupling-path control mode.

7. The magnetic disk drive according to claim 5, comprising a generator for generating the excitation signal, wherein the excitation signal is applied to the coarse actuator by adding the excitation signal to an output of the controller of the coarse actuator.

8. The magnetic disk drive according to claim 5, wherein in operation, the gain of the fine actuator in the decoupling-path control mode is obtained based on the deviation of the fine actuator model gain from the fine actuator gain.

9. The magnetic disk drive according to claim 5, wherein in operation, the calibration of the gain of the fine actuator model is repeatedly executed until the deviation of the fine actuator model gain from the fine actuator gain becomes equal to or smaller than a pre-defined value.

10. The magnetic disk drive according to claim 9, wherein in operation, an update of the gain of the fine actuator model during the repetition of the calibration is performed based on a history of past fine actuator model gains and their corresponding deviations from the fine actuator gain.

11. A magnetic disk drive comprising:
a magnetic disk,
a magnetic head adapted to read information recorded in the magnetic disk,
an arm adapted to support the magnetic head,
a coarse actuator adapted to drive the arm to move the magnetic head on the magnetic disk,
a fine actuator adapted to adjust a position of the magnetic head with respect to the arm, the fine actuator having a gain,
a fine actuator model adapted to estimate a magnetic head displacement generated by the fine actuator, the fine actuator model having a gain,
a feedback path for feeding back a positional error signal indicating a positional error between a target position and a present position of the magnetic head, to a controller of the fine actuator and to a controller of the coarse actuator,
a decoupling path adapted to add, in a decoupling-path control mode, the magnetic head displacement generated by the fine actuator estimated using the fine actuator model, to the positional error signal fed back to the controller of the coarse actuator, and
a periodic disturbance canceler coupled in parallel with the fine actuator controller and adapted to generate a control signal for the fine actuator to cancel a periodic disturbance having a pre-determined period;
wherein in operation, the magnetic disk drive obtains a first gain of an open-loop transfer function of a feedback loop of the coarse actuator at a first condition characterized in that an excitation signal is applied to the coarse actuator while the periodic disturbance canceler generates the control signal for the fine actuator to cancel a periodic disturbance caused by the excitation signal, and the positional error signal is fed back to the controller of the fine actuator and to the disturbance canceler,
wherein in operation, the magnetic disk drive obtains a second gain of an open-loop transfer function of the coarse actuator feedback loop at a second condition characterized in that the excitation signal is applied to the coarse actuator and the position error signal is not fed back neither to the controller of the fine actuator nor to the disturbance canceler,
wherein in operation, the magnetic disk drive obtains a deviation of the fine actuator model gain from the fine actuator gain in the decoupling-path control mode by comparing the first and the second gain of the open-loop transfer function, and
wherein in operation, the gain of the fine actuator model is calibrated based on the obtained deviation of the fine actuator model gain from the fine actuator gain.

12. The magnetic disk drive according to claim 11, wherein the periodic disturbance canceler generates the control signal corresponding to the excitation signal so that the magnetic head displacement generated by the fine actuator at a first frequency of the excitation signal cancels a magnetic head displacement generated by the coarse actuator in response to the excitation signal at the first frequency.

13. The magnetic disk drive according to claim 12, wherein the periodic disturbance canceler has a second order discrete-time infinite impulse filter (IIR).

* * * * *